UNITED STATES PATENT OFFICE.

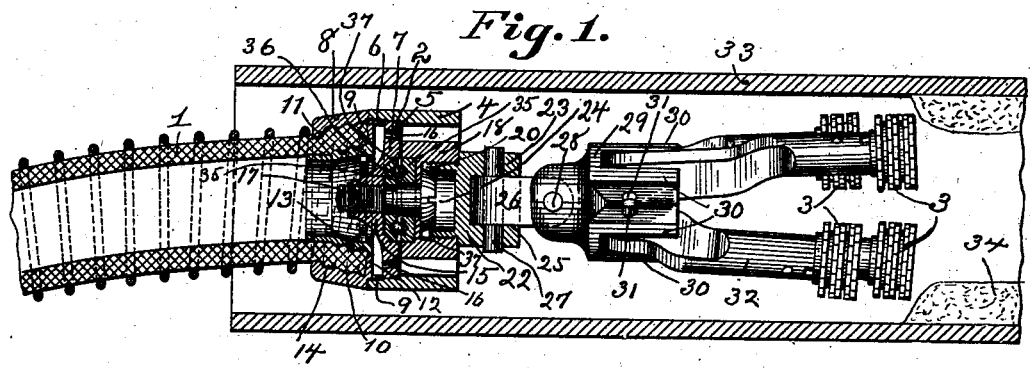

JOHN P. PRENTICE AND ROBERT G. GREGORY, OF BARBERTON, OHIO, ASSIGNORS TO THE STIRLING COMPANY, OF CHICAGO, ILLINOIS, A CORPORATION OF ILLINOIS.

TURBINE FLUE-CLEANER.

SPECIFICATION forming part of Letters Patent No. 708,254, dated September 2, 1902.

Application filed July 17, 1901. Serial No. 68,629. (No model.)

*To all whom it may concern:*

Be it known that we, JOHN P. PRENTICE and ROBERT G. GREGORY, residents of Barberton, in the county of Summit and State of Ohio, have invented a new and useful Improvement in Turbine Tube-Cleaners; and we do hereby declare the following to be a full, clear, and exact description thereof.

Our invention relates to apparatus for cleaning boiler-tubes, and more especially to the kind which are known as "turbine tube-cleaners," wherein the tool or tools are rotated by a turbine wheel actuated by a fluid-pressure.

The object of our invention is to reduce the length of the apparatus, and more especially the length of the motor portion thereof, so that the apparatus can be more readily used in bent and curved tubes and in places which are not easily accessible.

A further object of our invention is to provide a secure attachment for the hose or tube to the motor, which while holding the hose securely in place does not materially add to the length of the motor.

A further object of our invention is to provide apparatus of this kind which occupies a minimum of space and which is easy to use, strong, and efficient.

In the accompanying drawings, Figure 1 is a longitudinal section through our apparatus, showing the same applied in a tube. Fig. 2 is a longitudinal section through the motor-casing, showing the perforated disk partly broken away. Fig. 3 is a face view of the perforated disk, and Fig. 4 is a similar view of the turbine wheel.

The apparatus comprises the hose or tube 1, the motor 2, and the cleaning-tools 3. The motor comprises a suitable cylindrical casing 4, which is provided near one end with the internal shoulder 5 and at the same end with the internal screw-threads 6. Located within this casing is the perforated disk 7, which forms the stationary part of the motor and which is seated against the internal shoulder 5.

8 represents an extension of the casing, the same being provided with the externally-screw-threaded portion 9, which engages the screw-threads 6 of the casing and the end of which bears against the perforated disk 7 and holds the same securely in place against the shoulder 5. The extension 8 tapers gradually toward its rear end, as shown, and is provided on its interior with a series of spirally-arranged grooves or depressions 10 and at its rear end with an internal projection or flange 11, which forms a restricted opening into the casing, while near its forward end said casing extension is provided with the internal flange 12. The hose 1 is inserted into this extension 8, with its end abutting against the inwardly-projecting flange 12, and the hose is then secured in place by means of the tapering thimble or bushing 13, which is provided with external spiral ribs or projections 14, which correspond to the depressions 10 in the casing extension. This thimble or bushing is provided with suitable slots (not shown) for receiving a suitable tool, whereby it is screwed into the interior of the hose or tube 1, thereby firmly clamping the latter between said thimble and the casing extension 8, as shown, the forward end of said thimble or bushing being even with the flange 12, as shown.

The stationary disk 7 is provided with a rearwardly-projecting central conical portion 15 and with a series of openings 16 near its edge, which openings extend in an oblique direction through said disk, as shown, the conical portion 15 being provided with a threaded opening for receiving the threaded end of the screw 17, upon which the turbine wheel 18 is journaled. This turbine wheel is provided on its periphery with the curved grooves 19, through which the water is projected to rotate said turbine wheel. These grooves being on the periphery of the wheel give the greatest possible leverage, thereby increasing the torque of the turbine. Furthermore, there is no shrouding for the turbine wheel, the casing serving for this purpose, and the wheel can be correspondingly enlarged, thereby adding to the leverage on which the water acts. This turbine wheel is provided on its forward face with the socket 20, in which is seated the head 21 of the journal-screw 17. This socket 20 is internally screw-threaded for receiving the external screw-threaded projection 22 of the block 23, to which the tool-body is secured, as will hereinafter be explained. The end of the projection 22 is recessed, as at 24, and it fits over the head 21 of the screw 17, so that these parts are securely fastened together and yet occupy as little space lengthwise as possible.

The forward end of the block 23 is provided with a transverse slot 25 for receiving one end of the link 26, said link being pivoted on a pin 27, passing therethrough and through the block 23. The opposite end of this link is provided with a hole which is at right angles to the pin 27, and said end is pivoted on a pin 28, passing through suitable ears in the body 29 of the tool. This tool-body is provided with a series of radial ears 30, four pairs of such ears being shown at intervals of ninety degrees from each other, although a greater or lesser number may be employed, if desired. Pivoted between these pairs of ears by means of suitable pins 31 are the arms 32, which at their outer ends carry the tools 3, said arms being free to move outward under centrifugal force as the tool rotates in order to bring the tools 3 into contact with the inner surface of the tube 33 to remove the incrustation 34 thereon.

The perforated disk 7 and the turbine 18 are provided on their meeting faces with suitable seats of hardened metal 35, the same being provided with annular V-shaped grooves 36, which form a runway for the antifriction-balls 37, in order to reduce the friction of these parts.

The conical projection 15 on the perforated disk 7 directs the fluid-pressure outward and through the inclined openings 16 in said disk, from which the fluid-pressure passes through the curved grooves 19 in the turbine, the perforations 16 and the grooves 19 being inclined with reference to each other, so as to get the best rotating effect, as is well understood in this art.

The forward end of the thimble 13 is flush with the flange 12, thereby leaving sufficient space to the rear of the perforated plate 7 for the free flow of the fluid-pressure, and the flange 12 prevents the end of the hose from being inserted to such an extent as to close this passage, while the thimble 13 and the tapered extension 8 provide a means for securely holding the end of the hose, but without materially increasing the length of the motor, the rear end of said thimble and extension being but a little to the rear of the end of the conical projection 15 of the disk 7. Furthermore, the socket 24 in the turbine wheel and the recessed extension 22 of the block 23 form a chamber for the head 21 of the journal-screw 17, whereby these parts are secured together compactly and so as to occupy the least possible space longitudinally. The placing of all of the radial ears 30 of the tool-body in the same transverse plane also shortens the tool, as in prior devices of this character one pair of the arms 32 has been pivoted in one transverse plane, while the other pair was pivoted in a transverse plane to the rear of the pivotal points of the first pair.

The link 25, together with the pins 27 and 28 at right angles to each other, provides a simple and strong universal connection between the motor and the tool-body, so the same can freely rotate and gyrate, one in which all the parts can be made of forged steel and the blocks 23 and tool-body 29 can each be made of a single integral piece. Tools of this character have heretofore been provided with universal couplings, such as knuckle-joints, having two pivot-pins or trunnions at right angles to each other and in the same plane. As a consequence the parts of such joint, or at least one of them, had to be made in two sections, so that the joint could not be made from forgings, but only from castings, as a consequence of which their strength was not very great.

In the use of our apparatus the tool is introduced into the tube, after which fluid-pressure is admitted through the hose or tube 1 and acts in the well-known manner to rotate the turbine wheel 18 and the tool-body 29, thereby causing the arms 32 to rotate and move outward under centrifugal force, bringing the tools 3 into contact with the incrustation 34 in the tube and removing the same in the well-known manner.

What we claim as our invention, and desire to secure by Letters Patent, is—

1. In a boiler-tube cleaner, the combination with a casing having a tapered portion provided with a restricted opening, of a hose or tube projecting into said tapered portion, a bushing or thimble fitting within said tube or hose and clamping the same against the inner wall of the tapered portion, a perforated disk in said casing adjacent to the forward end of the bushing or thimble and provided with a rearward-tapered portion projecting into said bushing, a motor-wheel mounted on said disk, and a tube-cleaning tool connected to said wheel.

2. In a boiler-tube cleaner, the combination with a casing having a tapered portion provided with spiral grooves or recesses on its inner face, of a hose or tube projecting into said tapered portion, a bushing or thimble fitting within said tube or hose and provided with spiral ribs which press the tube out into the holes or depressions in the casing, a perforated disk in said casing adjacent to the forward end of said bushing or thimble and provided with a rearward-tapered portion projecting into said bushing, a motor-wheel mounted on said disk, and a tube-cleaning tool connected to said wheel.

3. In a boiler-tube cleaner, the combination with a casing having a tapered portion at one end, of a hose or tube projecting into said tapered portion, an internal flange on the casing against which the end of the tube projects, a tapered thimble or bushing fitting within the tube and serving to clamp the same against the inner wall of the tapered portion, a perforated stationary disk adjacent to the end of the bushing and internal flange, a turbine wheel rotatably mounted in said casing, and a tube-cleaning tool connected to said wheel.

4. In a boiler-tube cleaner, the combination with a casing, a perforated disk fixedly mounted therein and provided with a rearwardly-tapered projection, a turbine wheel rotatably mounted on said disk, a tube-cleaning tool connected to said wheel, a tapered portion of said casing provided with an internal flange or shoulder so arranged as to leave a space between the same and the perforated disk, a hose or tube projecting into the casing against said flange or shoulder, and a tapered bushing fitting within said tube or hose and clamping the same against the inner wall of the casing.

5. In a boiler-tube cleaner, the combination with a casing provided with an internal shoulder and internal screw-threads, a perforated disk therein resting against said shoulder, a tapered extension having a threaded portion engaging the internal threads in the casing and bearing against the disk to clamp the same against the internal shoulder, a hose or tubing projecting into said extension, a tapered bushing or thimble fitting within the hose, a turbine wheel rotatably mounted on said perforated disk, and a tube-cleaning tool connected to said wheel.

6. In a boiler-tube cleaner, the combination with a casing provided with an internal shoulder and internal screw-threads, a perforated disk in said casing resting against said shoulder, said disk being provided with a rearwardly-projecting conical portion, a tapered extension having a threaded portion engaging the internal threads in the casing and bearing against the perforated disk to clamp the same against the internal shoulder, said extension being provided with an internal flange or shoulder, a hose or tube projecting into the extension and against said flange or shoulder, a conical bushing or thimble fitting within the hose or tube and serving to clamp the same against the inner wall of said extension, a motor-wheel rotatably mounted on said perforated plate, and a tube-cleaning tool connected to said wheel.

7. In a boiler-tube cleaner, a fluid-motor comprising a stationary perforated disk having a central opening, a motor-wheel provided with a central opening and a screw-threaded socket in one face thereof, a journal-pin having a head located in said socket and secured in the opening in the stationary disk, a tool-carrying block provided with a threaded extension engaging the screw-threaded socket in the wheel, said extension being recessed to fit over the head of the screw, and a tube-cleaning tool attached to said block.

In testimony whereof we, the said JOHN P. PRENTICE and ROBERT G. GREGORY, have hereunto set our hands.

JOHN P. PRENTICE.
ROBERT G. GREGORY.

Witnesses:
E. E. BAKER,
GEO. L. H. ROE.